United States Patent [19]

Zanier

[11] 4,389,784
[45] Jun. 28, 1983

[54] COMPARATOR WITH PIVOTING FEELER

[75] Inventor: Adriano Zanier, Prilly, Switzerland

[73] Assignee: Tesa, S.A., Renens, Switzerland

[21] Appl. No.: 303,719

[22] Filed: Sep. 21, 1981

[30] Foreign Application Priority Data

Oct. 2, 1980 [CH] Switzerland .................. 7352/80

[51] Int. Cl.³ .............................................. G01B 3/22
[52] U.S. Cl. ............................... 33/172 B; 33/DIG. 6
[58] Field of Search ....................... 33/172 B, DIG. 6

[56] References Cited

U.S. PATENT DOCUMENTS

| 1,770,148 | 7/1930 | Stevens | 33/172 B |
| 2,210,435 | 8/1940 | Ruf | 33/DIG. 6 |
| 2,308,207 | 1/1943 | Reinhard | 33/172 B |
| 2,898,686 | 8/1959 | Croshier et al. | 33/172 B |
| 3,464,118 | 9/1969 | Nagata | 33/172 B |
| 4,075,763 | 2/1978 | Yamaryo | 33/DIG. 6 |

FOREIGN PATENT DOCUMENTS

| 708168 | 7/1931 | France | 33/DIG. 6 |
| 553471 | 5/1943 | United Kingdom | 33/172 B |

Primary Examiner—Richard R. Stearns
Attorney, Agent, or Firm—Hedman, Casella, Gibson, Costigan & Hoare

[57] ABSTRACT

A comparator is provided including a body in which there is fastened a plate comprising a lever for transmission of movements of a pivoting feeler, and an amplification device, with gearing, actuated by said lever and driving a needle of a reading dial. The stroke of the transmission lever is limited by a rigid end-of-stroke stop. On the path of the transmission lever, a coil spring is arranged between its position of rest and its end-of-stroke position to protect the mechanism from accidental impact. In case of impact on the feeler, the energy developed by the amplification device is partly absorbed before the impact of transmission lever on the rigid end-of-stroke stop.

4 Claims, 2 Drawing Figures

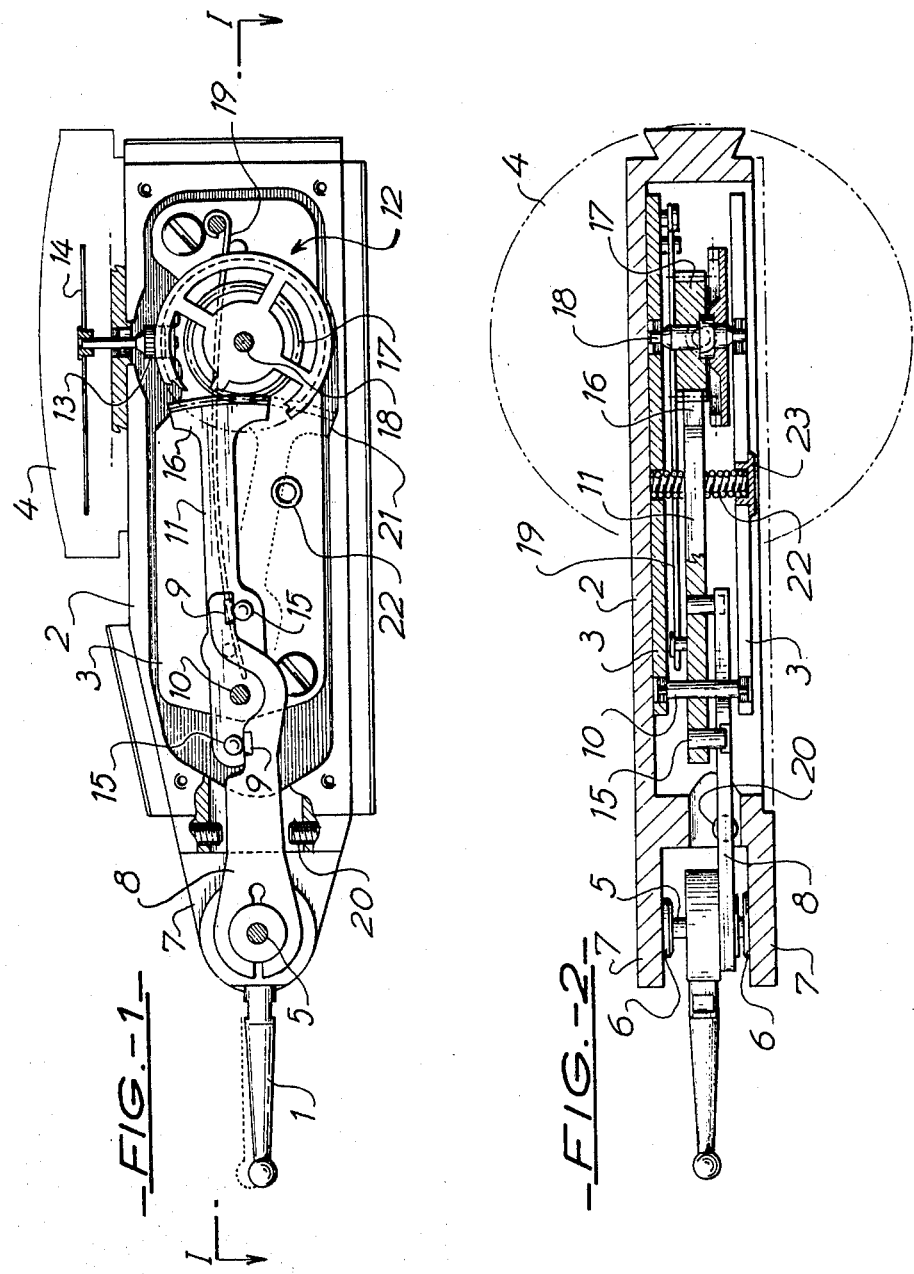

COMPARATOR WITH PIVOTING FEELER

The object of the present invention is a comparator with pivoting feeler having at least one lever for the transmission of the movements of the feeler, a displacement amplifying device actuated by said lever, and an indicator member under the control of said device to permit the reading of representative variables of the movements of the feeler, said transmission lever being limited in its stroke, from a position of rest, by at least one rigid end-of-stroke stop.

Comparators of this type are already known, they being used primarily in industry to check the size of an element of a part such as, for instance, the diameter of a borehole or of a shaft, by way of comparision with a standard value. In use these comparators are generally fixed on suitable supports so as to hold them in selected position with respect to the part to be checked, that is to say so as to assure concordance between the direction of the displacement of the active end of the feeler and the direction of the comparison measurement to be effected.

The displacement amplifying devices which these comparators contain vary in accordance with the use for which the latter are intended.

When the reading is to be effected at the very place of the measurement, the amplifying device generally consists of a train of step-up gears whose input pinion is driven by a toothed sector located at the end of the lever transmitting the movements of the feeler or of a multiplication lever mounted in combination and the output pinion of which is mounted on the pin of the indicating needle of a reading dial which is fastened on the body of the comparator.

When the reading is to be effected at a distance, this amplifying device is formed of an electronic circuit acted on by a detector housed in the body of the comparator and the moving element of which is displaced by the movement transmission lever of the feeler, either directly or by one or more multiplication levers.

Designed with reduced dimensions in order to facilitate the placing thereof in spaces which are at times narrow and therefore of low inertia, these comparators suitably withstand, within acceptable limits, accidental impacts caused by mistakes or errors in manipulation since the mechanical parts of their amplifier devices oppose only a slight amount of inertia to acceleration, as a result of their lightness.

However, at the present time there can be noted a substantial increase in damage resulting from rough handling or falls of these apparatus, caused primarily by impact of the feeler with hard objects. Thus there can be noted bends of the needle of reading dials and breaks of their pivots, bucklings of gears working on edge, breaking of gear teeth or else breaks of amplification lever pivots.

To the best of the knowledge of the inventor no solution has yet been provided for this recent state of affairs.

With respect to comparators comprising an amplification device with gear trains, the first idea which comes to mind would be to equip them with an anti-shock device of the type based on the known principle of elastic coupling between a coaxial pinion and gear wheel which yield elastically as soon as a certain predetermined force has been reached and which then return the pinion and the gear to the same relative angular position. However, these anti-shock devices are expensive due to the precision which they require and they take up an amount of space which requires a new dimensional structuring of the instruments, which makes them unusable for equipping the large number of comparators in service or in stock and disadvantageous in new constructions due to the increase in the size of the body of the instrument which they would make necessary.

More generally, for all types of comparators one could also contemplate mounting the feeler, a friction coupling, on a first transmission lever, in its pivot plane, which is done at present on certain comparators for the different purpose of making it possible to vary the orientation of the feeler with respect to the axis of the instrument. However, this solution contains an uncertainty in itself, namely either the frictional coupling is too soft and the comparator might come out of adjustment during use or handling or else the friction is too hard and the desired anti-shock effect would be lost. This view appears confirmed by the fact that the comparators equipped with feelers which can be oriented by frictional mounting suffer damage substantially in the same proportion as those which are not so equipped; the friction necessary and sufficient to assure the reliability of these instruments therefore seems already too great to assure an anti-shock effect at the same time.

The object of the invention is to assure an anti-shock effect which is free of the aforementioned disadvantages.

For this purpose, the comparator in accordance with the invention is characterized by the fact that it comprises at least one elastic deceleration stop arranged on the path of the lever for the transmission of the movements of the feeler between the position of rest and at least one end-of-stroke position of said lever.

This solution has the effect that in case of a sudden striking of the feeler against a hard object, the kinetic energy developed by the displacement amplification device under the impetus of the transmission lever is in part progressively absorbed before the latter strikes against its rigid end-of-stroke stop.

Analysis of the problem has shown, in fact, that it was probable that, on the comparators to which the invention refers, a part of the energy developed upon acceleration due to the impact of the feeler against a hard object is absorbed by the elasticity of the feeler and of the transmission lever before arriving at the amplification device, while the kinetic energy developed by the amplification device which is connected directly to said lever is fully preserved at the time of the impact of the latter on its rigid end-of-stroke stop and that therefore the damage noted occurs upon the sudden deceleration due to this impact rather than at the time of the acceleration due to the impact of the feeler.

Impact resistance tests carried out on comparators equipped with the elastic stop in accordance with the invention seem to prove the validity of this hypothesis, since no more damage of the type mentioned above has been noted.

Other advantages which result from this solution and answer the purpose sought will become clearly evident from the following description.

The accompanying drawing shows, by way of example one embodiment of the object of the invention.

FIG. 1 is a view in elevation thereof in partial section;

FIG. 2 is a top view thereof, in partial section, along the section line I—I of FIG. 1.

The comparator shown comprises a pivoting feeler 1, a body 2, a plate 3 and an indicator dial 4, shown in part.

The feeler 1 has a spherical feeler end and is screwed into the hub of a pivot 5 which is held in rotatable manner without play by two ball bearings 6 fastened in the two branches of an end fork 7 of the body 2.

Against the hub of the pivot 5 of the feeler 1 a lever arm 8 is fastened by friction in the extension of the feeler 1. This friction mounting is provided in order to make it possible to regulate as desired the orientation of the feeler 1 with respect to the body of the instrument, but it is not indispensible.

The end of the lever arm 8 remote from the feeler 1 has two aligned knife-bearing edges 9 spaced on opposite sides of a second pivot 10 borne by the plate 3.

This plate 3, which is rigidly connected to the body 1, comprises a lever 11 for transmitting the movements of the feeler 1 and a displacement amplifying device 12 actuated by said lever and formed by a train of gears whose output pinion 13 is mounted on the pin of the needle 14 of the indicating dial 4.

The transmission lever 11 has two cylindrical drive fingers 15 held resting elastically against the two knife-bearing edges 9 of the lever arm 8 of the feeler by a spring 19. This conformation has the effect of causing the transmission lever 11 to move at all times in the same direction with respect to a position of rest, which is the one shown, whatever the direction of pivoting of the feeler 1 around its pivot 5.

On its end remote from the fingers 15 the transmission lever 11 has a toothed sector 16 in engagement with the input gear 17 of the displacement amplifier device 12, the gear being mounted on a third pivot 18.

The two parallel walls of the plate 3 between which the transmission and amplification mechanisms are installed are connected by cross members, which have not been shown in order not to needlessly clutter the drawing.

The lever arm 8 of the feeler 1 is limited in its stroke as a function of the selected capacity of the instrument and in its two directions of pivoting by two adjustment screws 20 engaged in two coaxial threaded holes provided in the body 2 on opposite sides of the said lever arm. The transmission lever 11 is limited in its unidirectional stroke, from the position shown by a rigid end-of-stroke stop formed in this case by a portion 21 of the lower wall of the body 2 against which there strikes the lower end of the toothed sector 16 of this lever which is shown in thin dash lines in this end-of stroke position.

Between the position of rest and the end-of-stroke position of the transmission lever 11 an elastic deceleration stop is installed, in accordance with the teaching of the invention. This elastic stop is formed in this case of a coil spring 22 installed as a bridge between the two walls of the plate 3 on the path of the said lever.

This spring 22 is shown here engaged at one end in a first hole provided in a wall of the plate 3 and is held at its other end by a plug 23 engaged with light friction in a second hole, coaxial to the first made in the opposite wall of the said plate. The spring can also be mounted without the plug 23, which is held axially by the walls of the body 2.

This design of the elastic stop, without being limitative, nevertheless has the great advantage of simplicity and also the advantage of assuring at the least possible expense and without prejudicial immobilization the equipping of all comparators of this type now in service or in stock. It is sufficient in fact for the comparators to be equipped to have a free space on the path of their transmission lever or one of them if they have more than one arranged between two parallel walls, whether said walls are those of a plate similar to that shown or those of the body itself of the instrument.

The invention is applicable to comparators having a transmission lever of bidirectional stroke, that is to say having two opposite strokes on opposite sides of the position of rest. In this case, as the transmission lever of these comparators is normally equipped with two rigid end-of-stroke stops, there will be two elastic deceleration stops which will be installed, one in front of each of the two end-of-stroke positions of the lever.

The invention is also applicable to comparators with amplification device which have displacement multiplication levers, whether or not associated with a multiplying gear train.

Finally, in comparators having a plurality of transmission levers mounted in cascade, an elastic deceleration stop can be associated with each lever having a rigid end-of-stroke stop when more than one of them are equipped therewith.

I claim:

1. A comparator with pivoting feeler comprising:
   pivoting lever means for the transmission of the movements of said feeler;
   a displacement amplifying device driven by said pivoting lever means;
   an indicator member controlled by said amplifying device to permit reading values representing the movements of said pivoting feeler;
   spring means for urging said pivoting lever means into a rest position;
   end-of-stroke stop means for limiting the pivotal movement of said pivoting lever means from said rest position; and
   coil spring means having two fixed ends and a free portion therebetween, said coil spring means being arranged on the path of said pivoting lever means at a distance from said rest position and said end-of-stroke stop means with its axis perpendicular to the plane of pivoting of said pivoting lever means.

2. A comparator with pivoting feeler according to claim 1, further comprising two parallel walls, wherein said pivoting lever means is housed between said two walls, and wherein said coil spring means is bridging said two walls.

3. A comparator with pivoting feeler according to claim 2, wherein said two walls are provided with two coaxial holes, and wherein said coil spring means has its two ends engaged respectively in said two coaxial holes.

4. A comparator with pivoting feeler according to claim 2, wherein each of said two walls is provided with a hole disposed therein such that the holes are coaxially aligned, and wherein one said fixed end of said coil spring means is engaged in the hole in one of said walls and the other fixed end of said coil spring means is held by a plug fixed in the hole in the other of said walls.

* * * * *